(12) United States Patent
Schuler

(10) Patent No.: US 11,970,335 B2
(45) Date of Patent: Apr. 30, 2024

(54) HANGING REGISTER STORAGE UNIT FOR A BENDING MACHINE FOR SPACER FRAMES OF INSULATING GLASS PANES

(71) Applicant: Glaston Germany GmbH, Hamberg (DE)

(72) Inventor: Peter Schuler, Tiefenbronn (DE)

(73) Assignee: Glaston Germany GmbH, Neuhausen-Hamberg (DE)

( * ) Notice: Subject to any disclaimer, the term of this patent is extended or adjusted under 35 U.S.C. 154(b) by 871 days.

(21) Appl. No.: 16/948,589

(22) Filed: Sep. 24, 2020

(65) Prior Publication Data

US 2021/0002073 A1 Jan. 7, 2021

Related U.S. Application Data

(63) Continuation of application No. PCT/EP2019/059145, filed on Apr. 10, 2019.

(51) Int. Cl.
| | |
|---|---|
| *B65G 1/04* | (2006.01) |
| *B65G 1/127* | (2006.01) |
| *E06B 3/673* | (2006.01) |
| *C03B 23/023* | (2006.01) |

(52) U.S. Cl.
CPC ........... *B65G 1/0457* (2013.01); *B65G 1/127* (2013.01); *E06B 3/67313* (2013.01); *B65G 2201/022* (2013.01); *C03B 23/023* (2013.01)

(58) Field of Classification Search
CPC .............................. B65G 1/0457; B65G 1/127
See application file for complete search history.

(56) References Cited

U.S. PATENT DOCUMENTS

| | | | |
|---|---|---|---|
| 4,147,176 A | 4/1979 | Christianson | |
| 5,147,176 A * | 9/1992 | Stolzer | B65G 1/0471 |
| | | | 700/218 |
| 10,807,798 B1 * | 10/2020 | Kalm | B65G 1/1378 |
| 11,479,409 B2 * | 10/2022 | Hedley | B65G 1/127 |
| 2012/0168282 A1 * | 7/2012 | Jones | B65G 1/127 |
| | | | 198/793 |

FOREIGN PATENT DOCUMENTS

| | | |
|---|---|---|
| DE | 44 28 372 A1 | 2/1996 |
| EP | 0 635 093 B1 | 1/1995 |
| EP | 0 983 949 A1 | 3/2000 |
| EP | 1 314 659 A2 | 5/2003 |
| EP | 2 407 703 A1 | 1/2012 |

* cited by examiner

*Primary Examiner* — Mark C Hageman
(74) *Attorney, Agent, or Firm* — Orbit IP

(57) ABSTRACT

A hanging register storage unit for a bending machine for spacer frames of insulating glass panes includes: a plurality of hanging registers which each have a storage site for a stack of unbent spacer profiles; a storage station having a plurality of receiving sites for in each case one of the hanging registers; a removal station having at least one receiving site for one of the hanging registers; and a conveyor device for transporting hanging registers between the receiving sites of the storage station and the receiving site of the removal station.

9 Claims, 8 Drawing Sheets

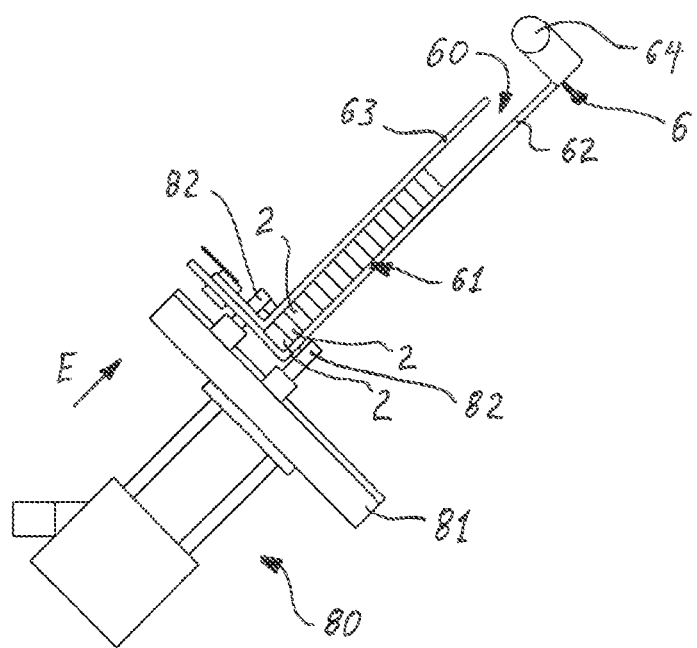
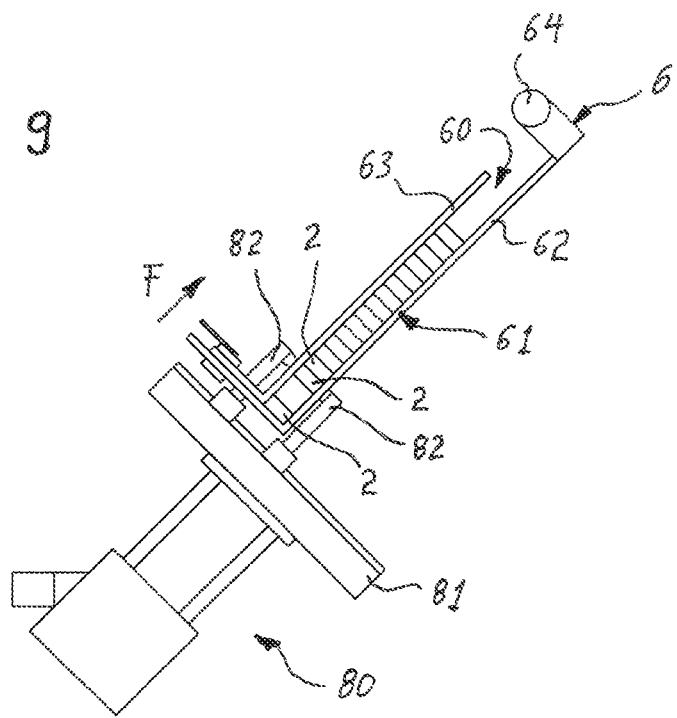

HANGING REGISTER STORAGE UNIT FOR A BENDING MACHINE FOR SPACER FRAMES OF INSULATING GLASS PANES

CROSS-REFERENCE TO RELATED APPLICATIONS

This continuation application claims priority to PCT/EP2019/059145 filed on Apr. 10, 2019 which has published as WO 2019/201716 A1 and also the German application number 10 2018 108 969.4 filed on Apr. 16, 2018, the contents of which are fully incorporated herein with these references.

DESCRIPTION

Field of the Invention

The invention relates to a storage unit for spacer profiles, which are bent into spacer frames for insulating glass panes in a known manner by means of a bending machine.

Background of the Invention

Insulating glass panes comprise several glass plates, which are spaced apart by a spacer frame arranged along their edge, so as to ensure a gas-filled gap between the glass plates. Spacer frames have long been fabricated using hollow profiles, which are bent into frames according to the desired pane dimensions. The cavity inside of the spacer profiles is then filled with a desiccant. The process of bending and filling spacer frames has long since been known and is described, for example, in DE 44 28 372 A1 and EP 0 635 093 B1.

The unbent, as yet straight spacer profiles are stacked sorted according to their dimensions, and held in a storage unit, for example a shelf, with several storages for a respective stack, and from there fed to a bending machine.

An object of the present invention is to create an improved storage unit for unbent spacer profiles, which can be used in combination with an automatic bending machine for spacer frames.

This object is achieved by a hanging register storage unit with the features of claim 1. Advantageous refinements are the subject of the dependent claims.

SUMMARY OF THE INVENTION

An automatic bending machine for spacer frames of insulating glass panes is placed upstream from the hanging register storage unit according to the invention. A spacer profile can be automatically removed from a storage and fed to a bending machine as needed. The bending machine can bend it into a spacer frame with the desired dimensions, which can subsequently be filled with desiccant. If an unbent spacer profile is not completely used, the bending machine can return a leftover piece to the storage. The supply to and return from the bending machine can take place along the longitudinal direction of the unbent spacer profile.

The hanging register storage unit comprises several hanging registers and a storage station with several receiving places, one for each of the hanging registers. Each hanging register has a storage for a stack of unbent spacer profiles, and has a longitudinal direction that runs parallel to the longitudinal direction of the spacer profiles to be stored therein. The hanging register storage unit further comprises a removal station with at least one receiving place for one of the hanging registers, as well as a conveyor device for transporting hanging registers between at least one of the receiving places of the storage station and the receiving place of the removal station. The receiving places of the storage station can receive the hanging registers in a suspended position. The receiving places can be fixedly or movably arranged inside of the storage station. The conveyor device can likewise transport the hanging registers in a suspended position.

The invention has significant advantages:

The hanging register storage unit is quite simple in design, and easy to manufacture.

The capacity of the hanging register storage unit can very easily be tailored to the needs of the user, for example a manufacturer of insulating glass panes. A manufacturer of insulating glass panes produces them in varying dimensions, to also include varying distances between the individual glass plates, which for example may lie within a range of 4 mm to 30 mm. Varying spacer profiles are required for the pane gaps of varying width. The number of hanging registers in the hanging register storage unit is chosen based on the number and quantity of required spacer profiles, and has practically no upper limit.

The storage of hanging registers in a storage station, in which the hanging registers can be suspended in receiving places, is quite easy and space-saving. The removal and transport of hanging registers between the receiving places of the storage station and the receiving place of the removal station are very easily possible.

The hanging register storage unit offers a high flexibility, and reduces the downtime of the bending machine to a very great extent when switching between spacer profiles of varying dimensions.

If several receiving places are fixedly arranged inside of the storage station, the conveyor device can transport hanging registers between these receiving places of the storage station and the receiving place of the removal station. For example, the conveyor device can be arranged above the receiving places, so as to suspend the hanging registers in receiving places arranged side by side, and remove them therefrom.

If several receiving places are movably arranged inside the storage station, the conveyor device can transport hanging registers between one of these receiving places of the storage station and the receiving place of the removal station. The receiving places of the storage station can be arranged on a movable conveyor chain.

Another embodiment of the invention can provide that the hanging register storage unit have a filling station, which has at least one receiving place for one of the hanging registers, and in which a storage of a hanging register can be filled by an operator, while the bending machine with an as yet still filled hanging register in the removal station can continue operating. After filling is complete, the conveyor device can transport this hanging register from the receiving place in the filling station back to a free receiving place in the storage station, or even directly to the removal station. As a result, the bending machine is not idled while filling up storages. To achieve a low space requirement and good accessibility, it may be advantageous to arrange the filling station on the side of the storage station lying opposite the removal station.

As opposed to the receiving places of the storage station, the receiving place of the removal station can receive the hanging register in a position tilted around the longitudinal direction of the spacer profiles. The bending machine usually processes the spacer profile in such a way that the lateral surfaces of the spacer profile are slanted relative to the vertical, and has a supporting surface rearwardly inclined from the vertical for the bent spacer frame, for example which can have an angle of 6° to 45° relative to the vertical. This ensures that the bent spacer frame remains lying on the support surface by itself, and does not tip over toward the front. In order to retain a hanging register in a position tilted around its longitudinal direction, the receiving place of the removal station can have a contact surface that is inclined in relation to the vertical. The hanging register storage unit can be removed from the storage station by the conveyor device in a suspended position, and placed from above onto the inclined contact surface of the receiving place in the removal station. A lower section of the hanging register here slides a bit along the contact surface, and guides the hanging register into a tilted position. The hanging register can be positioned in the receiving place of the removal station just by having its dead weight supported by the inclined contact surface. A stop in the receiving place of the removal station here prevents the hanging register from sliding down from the contact surface. As a consequence, complex mechanisms for tilting the hanging register or tilting the spacer removed from the storage are not required. The stack lying at a slant during removal can simplify the conveyance of the spacer profile between the storage and bending machine, and processing at that location. At the same time, each hanging register can have a very narrow design measured transverse to its longitudinal direction, and enables a space-saving suspension of the hanging registers in the storage station in a form in which the spacer profiles in the hanging register are stacked vertically one on top of the other. In comparison to storing the spacer profiles in stacks already tilted into the inclined position desired for removal, this greatly reduces the space requirement while keeping the number of storages constant.

In another embodiment, the receiving place of the removal station can have a clamping and hoisting device for a spacer profile that is located in a hanging register received on the receiving place of the removal station. The clamping and hoisting device can be used in the stack of spacer profiles to grip the second lowest spacer profile and lift it a bit, so that the lowest spacer profile of the stack can be unimpededly conveyed along its longitudinal direction out of the hanging register storage unit to the bending machine by means of an automatic conveyor device. In addition, the clamping and hoisting device ensures that a leftover portion of an unbent spacer profile in the bending machine can be returned to the lowest position in the stack again by the automatic conveyor device. The clamping and hoisting device can subsequently be lowered and opened again, for example to transport the hanging register from a receiving place of the removal station into the storage station.

Another embodiment can provide that the removal station have several, in particular three, receiving places. The receiving places of the removal station can be displaced horizontally, i.e., transversely to the longitudinal direction of the hanging registers or spacer profiles. As a result, the time for which the bending machine stands idle during a change involving a removal from various storages or hanging registers and/or a change between spacer profiles of varying dimensions can be reduced even further with little effort. The downtime of the bending machine can be diminished to the time needed for displacing the receiving places of the removal station from one position to the other.

Additional advantages and features of the invention may be derived from the following description of several illustrative embodiments in conjunction with the figures. Shown on:

BRIEF DESCRIPTION OF THE DRAWINGS

FIG. 8 is a cutout of the removal station on FIG. 6; and

FIG. 9 is a view similar to FIG. 8 at another point in time.

DETAILED DESCRIPTION OF THE PREFERRED EMBODIMENTS

Figure 1:
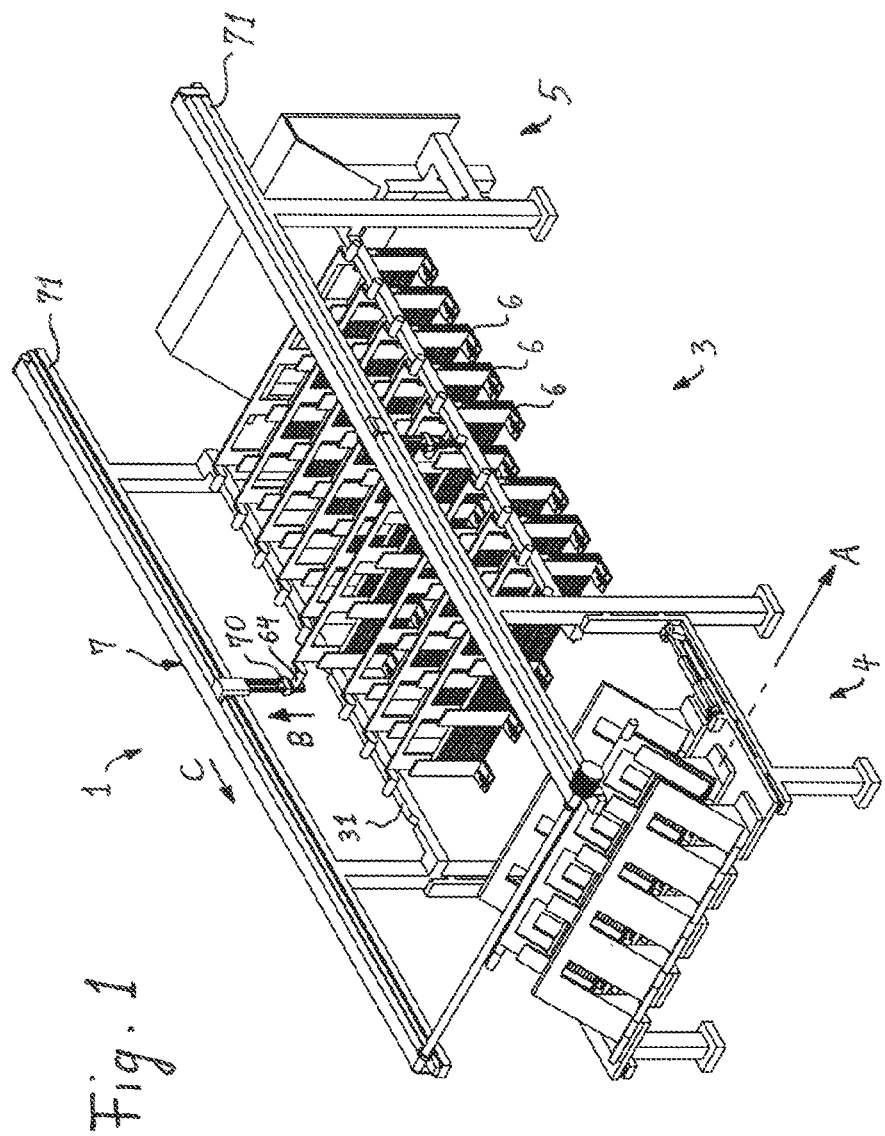
FIG. 1 is a schematic, diagonal view of a hanging register storage unit according to the invention.

The respective hanging register storage unit 1 for unbent spacer profiles 2 on the figures is shown schematically, and not to scale. The hanging register storage unit 1 is allocated to an automatic bending machine (not shown), which bends spacer profiles 2 removed along arrow A (see FIGS. 1 and 4) into spacer frames, which are used during the manufacture of insulating glass panes, in order to space apart two glass plates, so that a gas-filled gap remains between them. The hanging register storage unit 1 is not shown to scale on the figures in order to clarify the invention, since its varying dimensions in reality differ by several orders of magnitude. The spacer profiles 2 have a length of several meters, and a width that corresponds to the desired pane gap of the insulating glass panes and can lie within a range of 4 mm to 30 mm. Spacer profiles 2 with a width of 24 mm are often used. The hanging register storage unit 1 contains a storage station 3, a removal station 4 and a filling station 5, and its width as visible on FIGS. 2, 3 and 5 also lies on an order of magnitude of several meters. The hanging register storage unit 1 contains several hanging registers 6, wherein a configuration with ten hanging registers 6 is shown on FIGS. 1 to 3. The storage station 3 then contains ten receiving places 30 for a respective hanging register 6. For example, five hanging registers 6 per meter can be stored suspended one next to the other in the storage station 3, so that the depicted storage station 3 with ten receiving places 30 can have a width of approx. 2 m. The removal station 4 has three receiving places 40 for a respective hanging register 6, and the filling station 5 has a receiving place 50. The width of the storage station and the width of the filling station 5 can each measure about 1 m. The hanging register storage unit 1 contains a conveyor device 7 for transporting hanging registers 6 between the receiving places 30 and 40 or 50. In particular the number of hanging registers 6 and receiving places 30 is adjusted according to the required storage capacity. If necessary, several rows of receiving places 30 can be arranged one above the other in a manner not shown, wherein each row then has allocated to it its own conveyor device 7.

Figure 4:
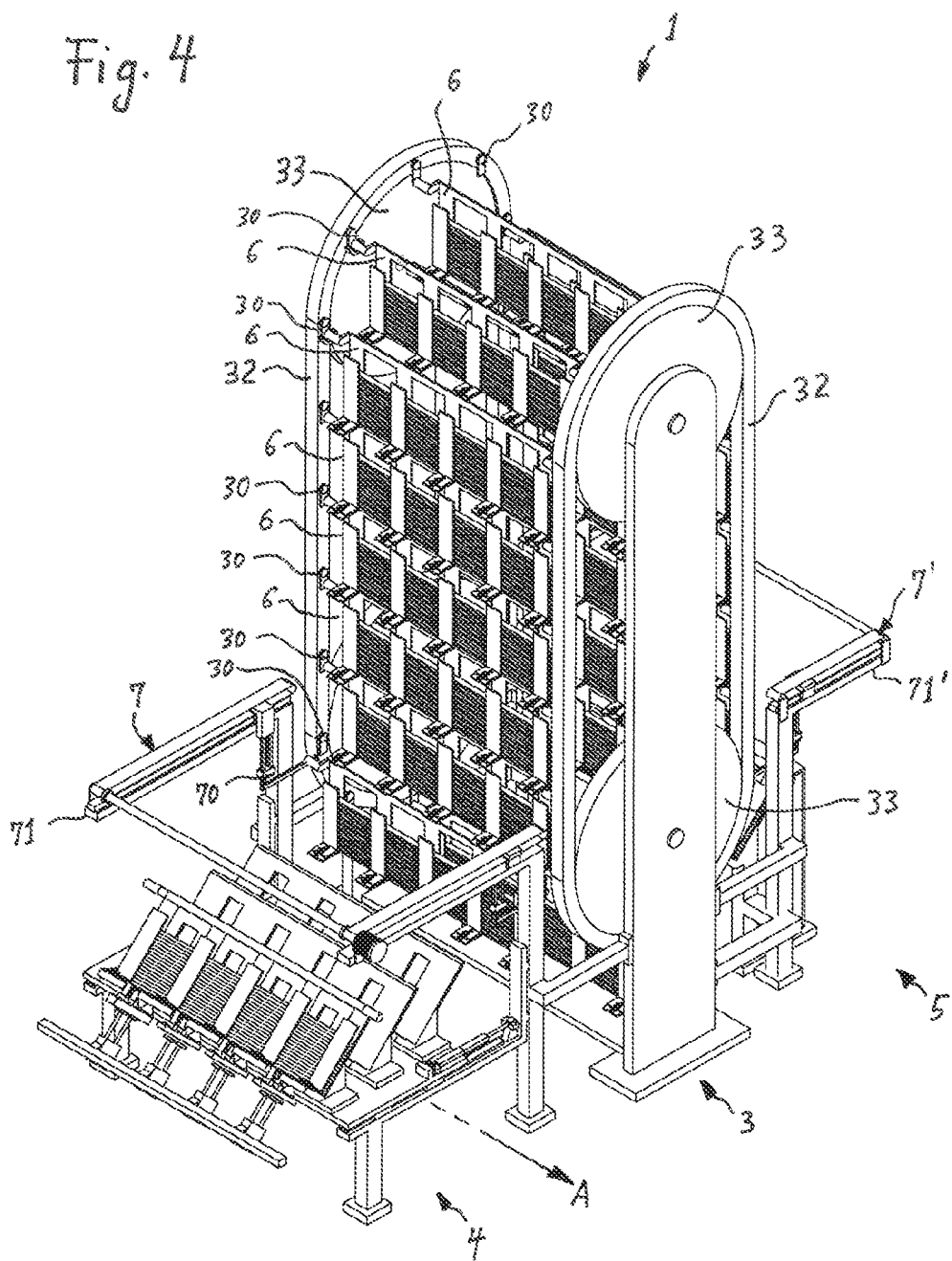
FIG. 4 is a view similar to FIG. 1 of a variant of a hanging register storage unit according to the invention.
Figure 5:
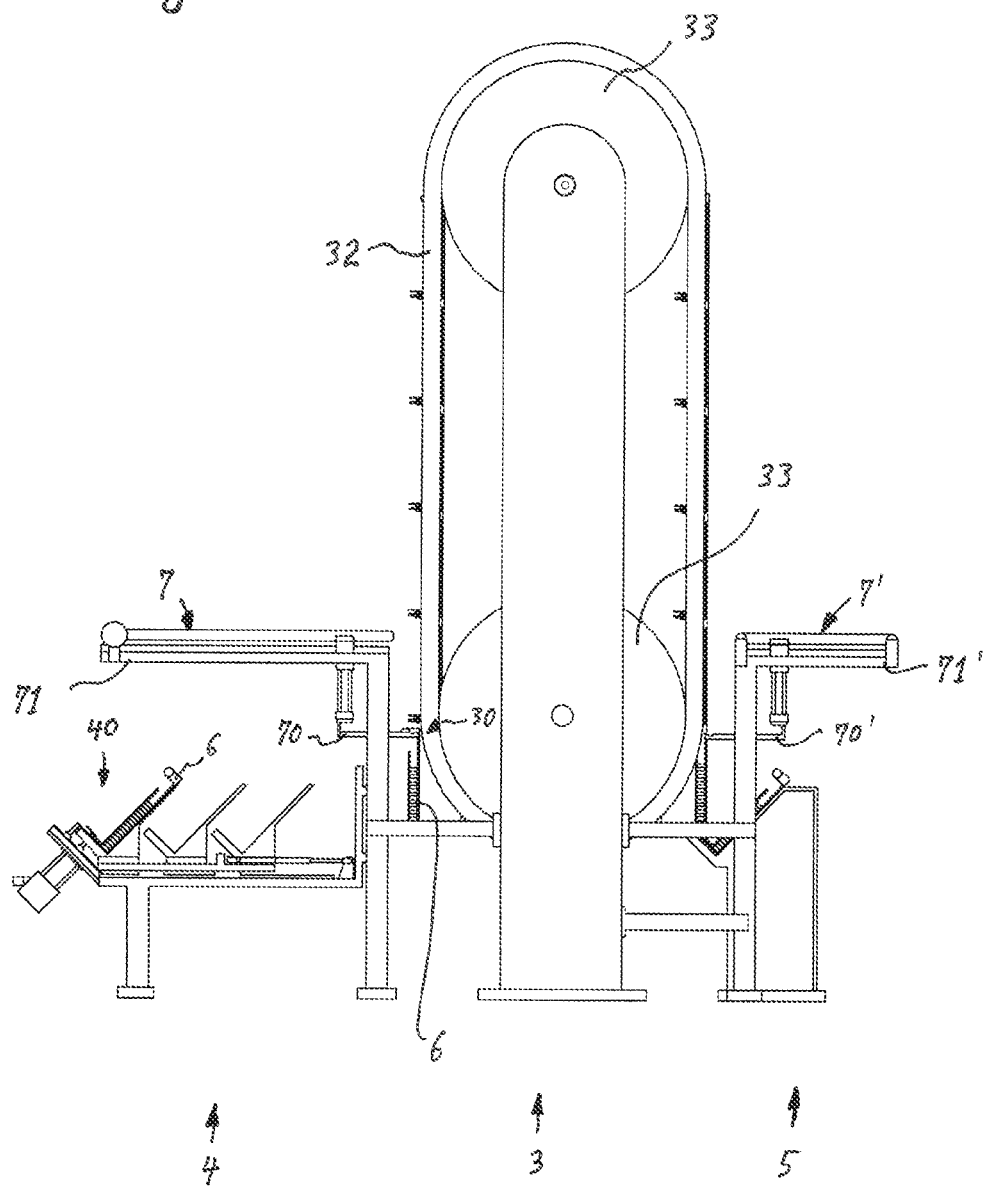
FIG. 5 is a schematic, side view of the hanging register storage unit on FIG. 4.

In the variant of the hanging register storage unit 1 shown on FIGS. 4 and 5, the receiving places 30 of the storage station 3 are arranged on two conveyor chains 32. Each conveyor chain 32 is guided through two deflecting rollers 33. At least one of the deflecting rollers 33 can be turned in a manner not shown by means of a drive device (not shown). As a result, the conveyor chains 32 move with the receiving places 30 and the hanging registers 6 suspended in the receiving places 30, resembling a kind of paternoster. Once the required receiving place 30 has reached the area that can be reached by the grasping device 70 of the conveyor device 7, the movement of the conveyor chains 32 is stopped. The conveyor device 7 can remove the required hanging register 6 from the storage station 3 and transport it to one of the receiving places 40 and back again. The arrangement of the receiving places 30 on the conveyor chains 32 can further reduce the width of the hanging register storage unit 1, and decrease the area required for the hanging register storage unit 1.

Figure 6:
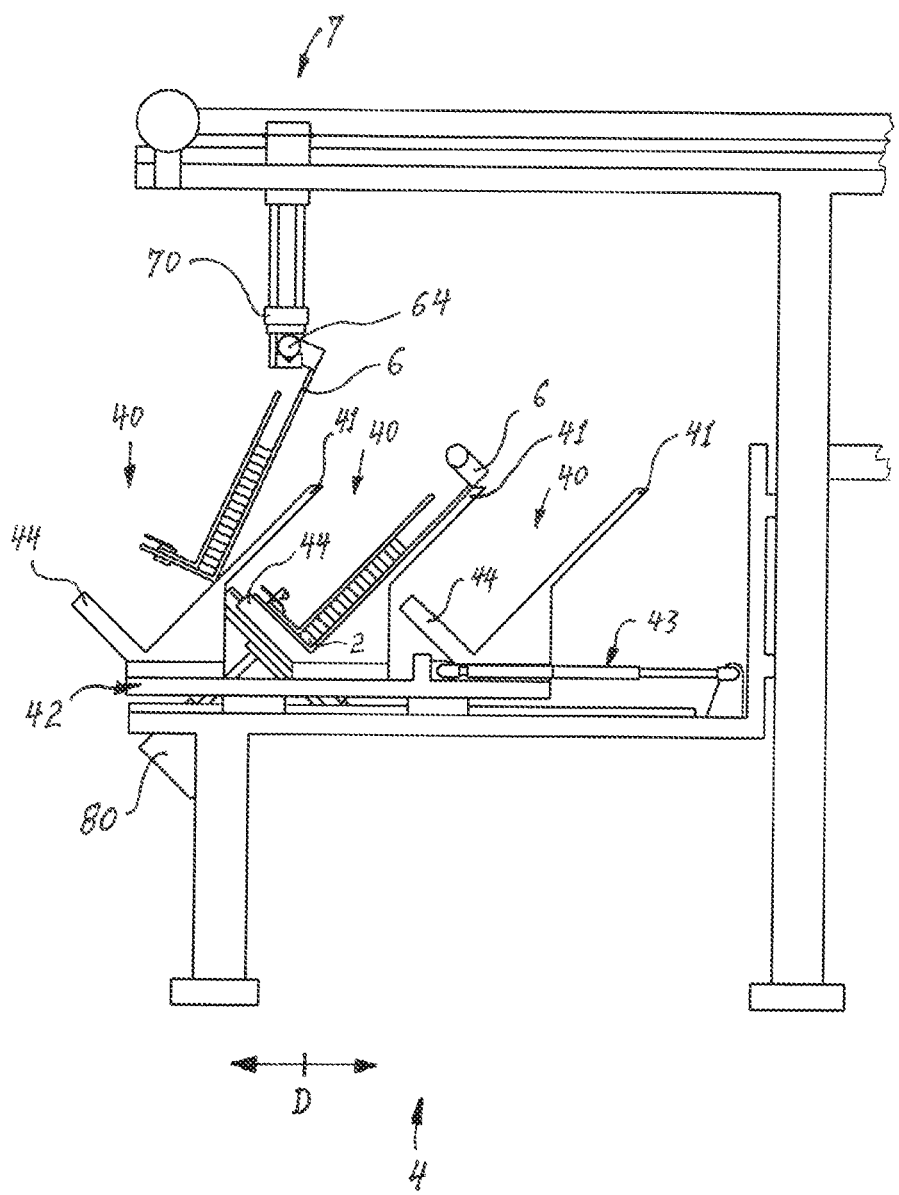
FIG. 6 is a side view of a removal station of the hanging register storage unit, magnified by comparison to FIGS. 3 and 5.
Figure 7:
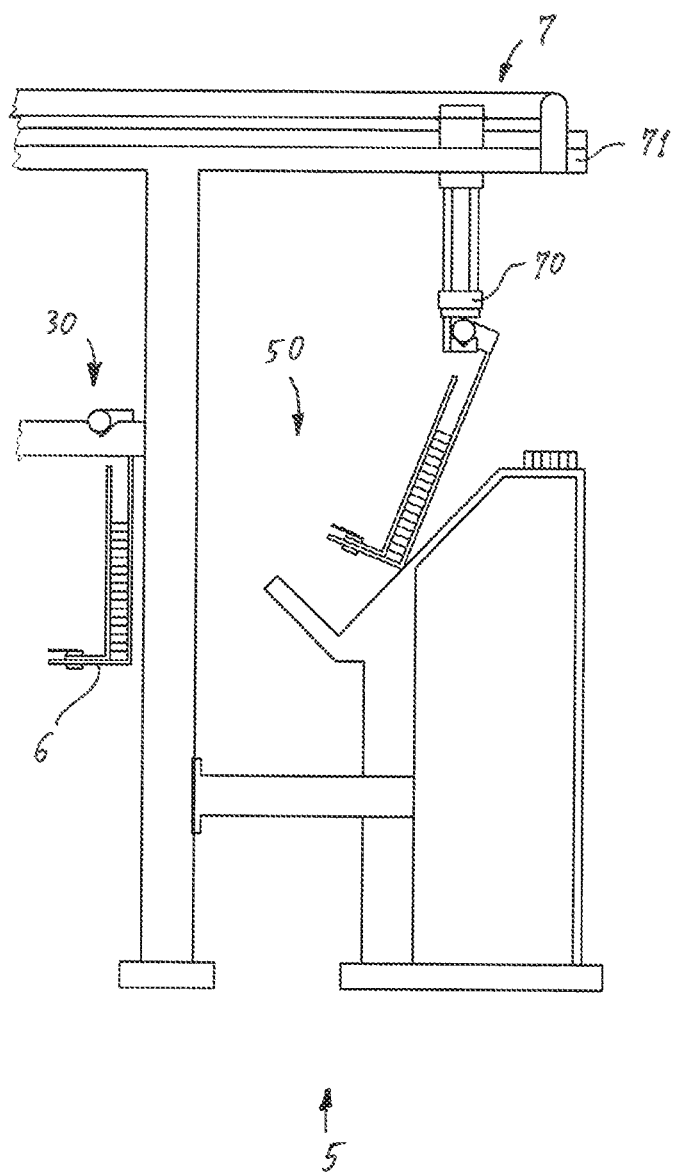
FIG. 7 is a side view of a filling station of the hanging register storage unit at another point in time, magnified by comparison to FIGS. 3 and 5.

In particular on FIGS. 6 and 7, it is evident that each hanging register 6 has a storage 60 for a stack 61 of spacer profiles 2. FIG. 6 shows a stack 61 containing 16 spacer profiles 2, which is secured against tilting by guides 62 and 63. The guide 62 is essentially L-shaped in cross section. The guide 63 can be moved transverse to the longitudinal direction of the spacer profiles 2 in relation to the guide 62, so as to be able to adjust the storage 60 to spacer profiles 2 of varying width. Arranged at each of the ends of the hanging register 6 in its upper area is a mounting bracket 64, with which the hanging register 6 can be hung in a receiving place 30 of the storage station 3. The receiving places 30 are located on two parallel carriers 31 (see FIGS. 1 and 2), or on two parallel conveyor chains 32 (see FIGS. 4 and 5), on which the mounting brackets 64 of the hanging registers 6 rest.

Figure 2:
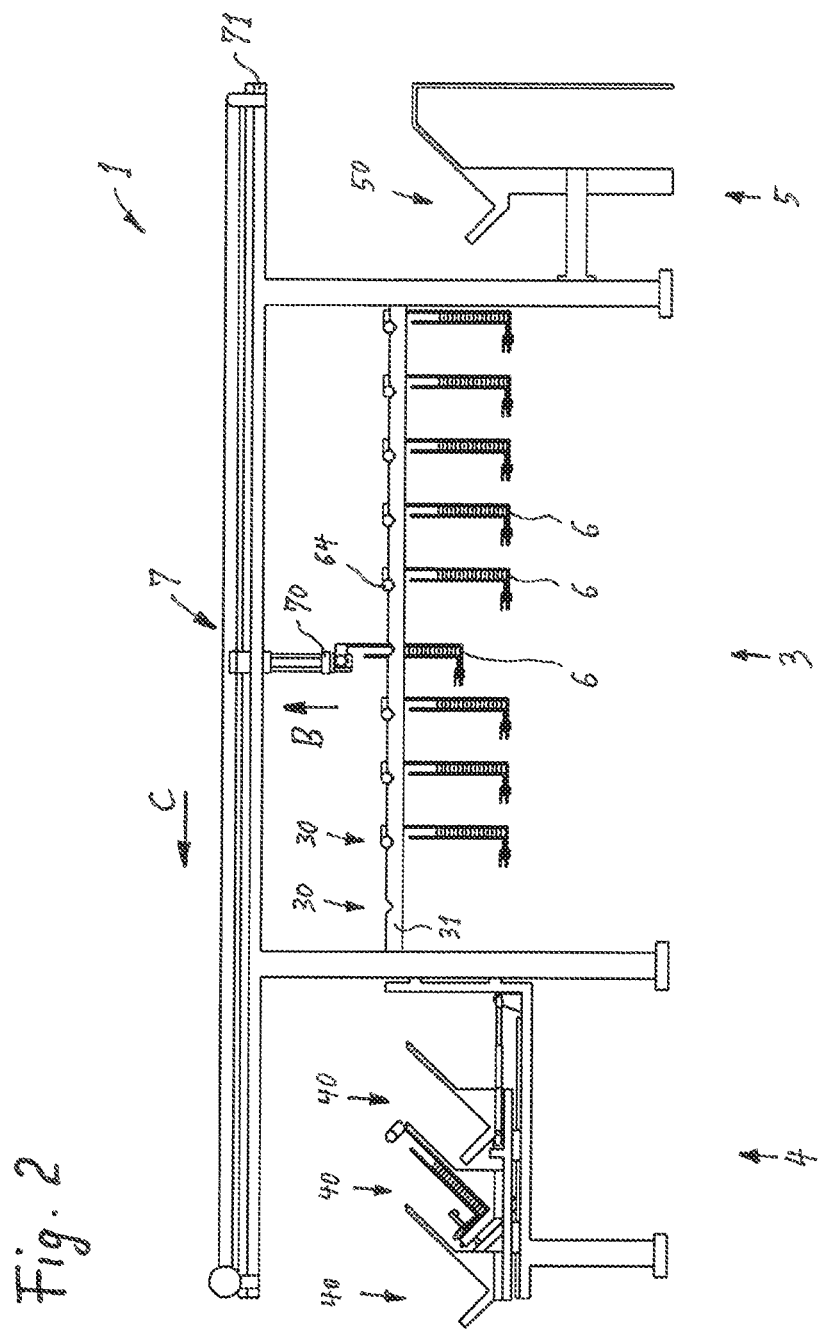
FIG. 2 is a schematic, side view of the hanging register storage unit on FIG. 1.
Figure 3:
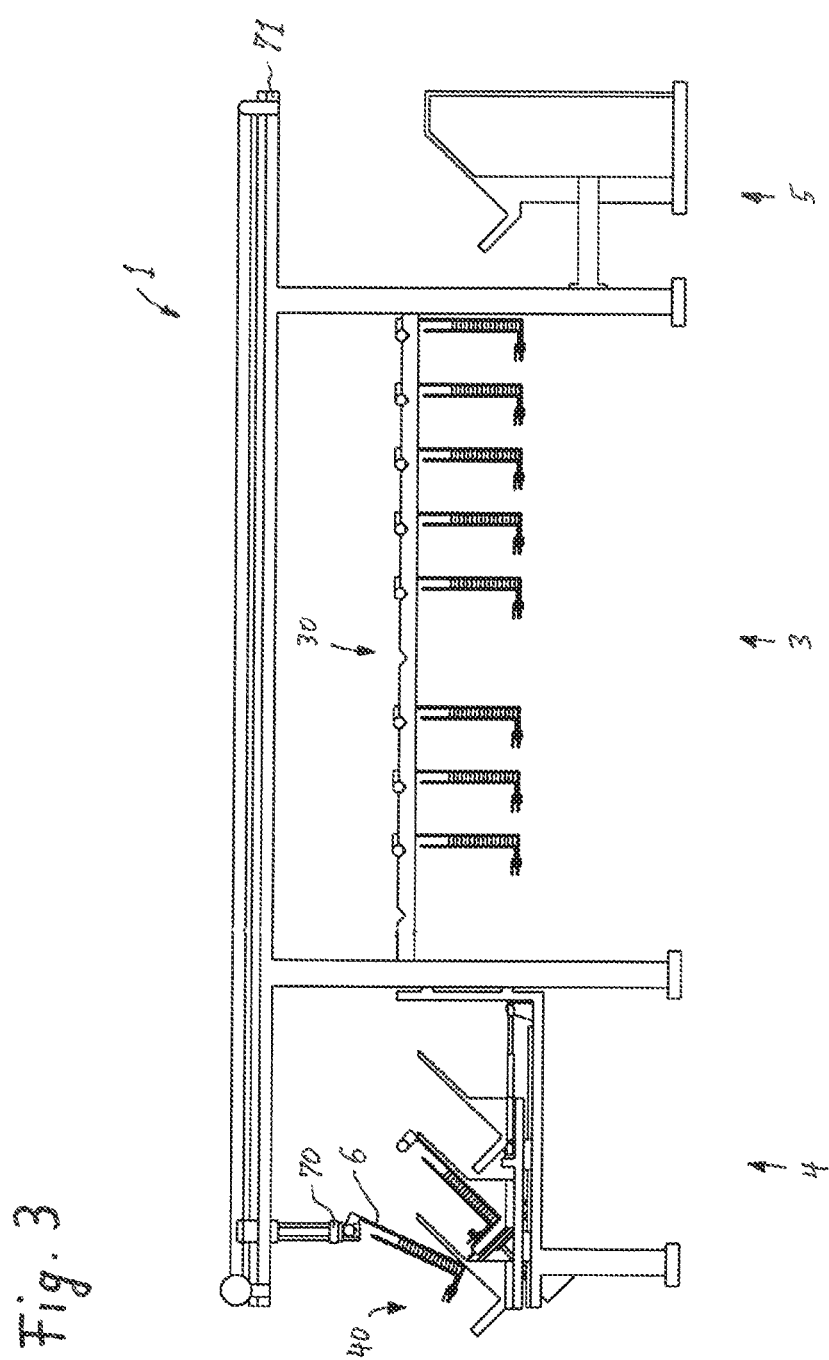
FIG. 3 is a side view similar to FIG. 2 of the hanging register storage unit at another point in time.

The conveyor device 7 for the hanging register storage unit 1 shown on FIGS. 1 to 3 is arranged above the receiving places 30, 40, 50, and contains two vertically and horizontally traversable gripping devices 70, which can be used to lift a hanging register 6 from its receiving place 30 toward the top in the direction of arrow B, see FIG. 2, and out of the storage station 3. The conveyor device 7 has two guide paths 71 that extend above the storage station 3, the removal station 4 and the filling station 5, which extend parallel to each other and essentially over the entire width of the hanging register storage unit 1. The gripping devices 70 grip the hanging register 6 at its mounting brackets 64 in such a way that the mounting brackets 64 act as fulcrums, around which the hanging register 6 suspended in the gripping device 70 can be tilted. After the hanging register 6 has been lifted over the storage station 3, the gripping devices 70 are driven on the guide paths 71 in the direction C to the removal station 4, see FIG. 3. The gripping devices 70 there lower the hanging register 6, and place it on a free receiving place 40. Alternatively, the conveyor device 7 can transport the hanging register 6 removed from the storage station 3 to the filling station, where the gripping devices 7 place it on the receiving place 50, see FIG. 5, so that its storage 60 can there be replenished by a machine operator.

The conveyor device 7 for the hanging register storage unit 1 shown on FIGS. 4 and 5 is designed according to the conveyor device 7 shown on FIGS. 1 to 3, and serves to transport hanging registers 6 between the receiving places 40 and a receiving place 30. The hanging register storage unit 1 on FIGS. 4 and 5 also has a second conveyor device 7' for transporting hanging registers 6 between the receiving place 50 and a receiving place 30. The conveyor device 7' is designed identically to the conveyor device 7.

Each of the three receiving places 40 has a contact surface 41 inclined in relation to the vertical for holding a hanging register 6 in a position tilted around its longitudinal direction, see in particular FIG. 4. The three receiving places 40 are arranged on a horizontally movable carriage 42, which can be moved to the left or right out of its central position shown on FIG. 4 by means of a drive device 43. The removal A along the longitudinal direction takes place from the hanging register 6, which is located at a schematically denoted removal position D. On FIG. 4, the hanging register 6 located on the central receiving place 40 is situated on the removal position D. The lowest spacer profile 2 is conveyed out of this hanging register 6 in the removal direction A and fed to the bending machine. At the same time, an additional hanging register 6 can be retrieved from the storage station 3 by the conveyor device 7, which contains spacer profiles 2 with the dimensions next required by the bending machine. The latter is lowered onto the left receiving place 40 by the gripping device 70, and in the process comes to rest on its contact surface 41. While lowering the gripping device 70, a lower section of the hanging register 6 slides along the inclined contact surface 41, and guides the hanging register 6 into a position tilted around its longitudinal direction, see FIG. 4. Each receiving place 40 contains a stop at the lower end of the contact surface 41, which prevents the hanging register 6 from continuing to downwardly slip off of the contact surface 41. The dead weight of the hanging register 6 causes it to remain lying on the contact surface 41 and the stop 44. In a quite simple way, this process combines a very space-saving, vertical storage of the stack 61 of spacer profiles 2 with a provision of spacer profiles 2 advantageous for the bending machine in a position tilted around their longitudinal direction.

While the bending machine is still being supplied with spacer profiles 2 from the central receiving place 40, an additional hanging register 6 has thus been placed on the left receiving place 40. In order to now be able to feed the next required spacer profile 2 to the bending machine from the left receiving place 40, the carriage 42 is moved to the right, out of its central position on FIG. 4, so that the hanging register 6 located on the left receiving place 40 is pushed into the removal position D, at which the lowest spacer profile 2 can be fed to the bending machine in the direction of arrow A, see FIG. 1. In like manner, another third hanging register 6 can be placed on the right receiving place 40 on FIG. 4, and be moved up to the removal position D by moving the carriage 42 to the left, so as to feed spacer profiles 2 from there to the bending machine. As a consequence, only a very short interruption comes about at the bending machine while switching from one hanging register 6 to the next, which corresponds to the time needed for horizontally moving the carriage 42. The significantly longer time for transporting hanging registers 6 into the storage station 3 or out of the latter does not lead to an interruption of bending machine operation.

The removal station 4 contains a clamping and hoisting device 80, which is allocated to the removal position D, and remains there while moving the carriage 42. The clamping and hoisting device 80 is used to clamp and hoist a spacer profile 2 of the stack 61, see in particular FIGS. 6 and 7. The clamping and hoisting device 80 contains clamping tongs 81 with two movable clamping jaws 82. In order to be able to feed the lowest spacer profile 2 of the stack 61 to the bending machine, the clamping tongs 81 with its clamping jaws 82 are moved out of a resting position located below the carriage 42 in the direction of the arrow E to the second lowest spacer profile 2. The clamping jaws 82 are closed, and grip the second lowest spacer profile 2. The clamping jaws 82 are then moved a bit in the direction of the arrow F, and the second lowest spacer profile 2 along with the stack 61 lying above it are hoisted, so that the lowest spacer profile 2 can be exposed and fed to the bending machine unimpeded. In addition, the hoisted stack 61 ensures that an unneeded leftover portion of the lowest spacer profile 2 can be transported back into the hanging register 6 from the bending machine, without the remaining spacer profiles 2 of the stack 61 impeding the return. The clamping and hoisting device 80 is subsequently moved back, and the hoisted stack 61 is placed down again.

The hanging register storage unit 1 contains a control unit, which controls the drive device 43, the conveyor device 7 and the clamping and hoisting device 80, and possibly also the conveyor chains 32, and which is connected with a controller of the bending machine downstream from the hanging register storage unit 1. For each of the hanging registers 6, the control unit of the hanging register storage unit 1 stores the dimensions of the spacer profiles 2 stored therein, and the receiving place 30 where it is stored. As a result, the handling register storage unit 1 can provide the bending machine with the required spacer profiles 2 in the required sequence.

Although several embodiments have been described in detail for purposes of illustration, various modifications may be made to each without departing from the scope and spirit of the embodiments of the invention. Accordingly, the invention is not to be limited, except as by appended claims.

REFERENCE LIST

1 Hanging register storage unit
2 Spacer profile
3 Storage station
4 Removal station
5 Filling station
6 Hanging register
7, 7' Conveyor device
30 Receiving place
31 Carrier
32 Conveyor chains
33 Deflection rollers
40 Receiving place
41 Contact surface
42 Carriage
43 Drive device
44 Stop
50 Receiving place
60 Storage
61 Stack
62 Guide
63 Guide
64 Mounting bracket
70, 70' Gripping device
71, 71' Guide path
80 Clamping and hoisting device
81 Clamping tongs
82 Clamping jaw
A Removal direction
B Direction
C Direction
D Removal position
E Direction
F Direction

What is claimed is:

1. A hanging register storage unit for a bending machine for spacer frames of insulating glass panes, said storage unit comprising:
   a plurality of hanging registers, each comprising a storage for a stack of unbent spacer profiles;
   a storage station comprising several receiving places, one for each of the hanging registers;
   a removal station comprising at least one receiving place for one of the hanging registers; and
   a conveyor device for transporting hanging registers between at least one of the receiving places of the storage station and the receiving place of the removal station;
   wherein the receiving place of the removal station has a contact surface inclined in relation to the vertical configured to retain a hanging register in a position tilted around its longitudinal direction.

2. The hanging register storage unit according to claim 1, comprising a filling station which comprises at least one receiving place for one of the hanging registers.

3. The hanging register storage unit according to claim 2, wherein the filling station is arranged on a side of the storage station that is opposite of the removal station.

4. The hanging register storage unit according to claim 1, wherein the receiving places of the storage station are configured to receive the hanging registers in a suspended position.

5. The hanging register storage unit according to claim 1, wherein the removal station comprises a clamping and hoisting device for a spacer profile, which is located in a hanging register received on the receiving place of the removal station.

6. The hanging register storage unit according to claim 1, wherein the removal station comprises several receiving places.

7. The hanging register storage unit according to claim 6, wherein the receiving places of the removal station are arranged on a movable carriage.

8. The hanging register storage unit according to claim 7, wherein the movable carriage is a horizontally movable carriage.

9. The hanging register storage unit according to claim 1, wherein the receiving places of the storage station are arranged on at least one movable conveyor chain.

* * * * *

UNITED STATES PATENT AND TRADEMARK OFFICE
CERTIFICATE OF CORRECTION

PATENT NO. : 11,970,335 B2
APPLICATION NO. : 16/948589
DATED : April 30, 2024
INVENTOR(S) : Peter Schuler It is certified that error appears in the above-identified patent and that said Letters Patent is hereby corrected as shown below:

On the Title Page

Column 1, below the Related U.S. Application Data:
Insert --Foreign Application Priority Data
April 16, 2018 (DE)........................ 10 2018 108 969.4--.

Signed and Sealed this
Twenty-fifth Day of June, 2024

Katherine Kelly Vidal
*Director of the United States Patent and Trademark Office*